United States Patent [19]
Clegg

[11] 3,717,944
[45] Feb. 27, 1973

[54] APPARATUS FOR ROOTED PLANT EXCAVATING

[76] Inventor: Samuel E. Clegg, 729 Bartlett Avenue, Plainfield, Ill. 60544

[22] Filed: Nov. 3, 1970

[21] Appl. No.: 86,432

[52] U.S. Cl. .................................................37/2 R
[51] Int. Cl. ............................................A01g 23/06
[58] Field of Search ......................................37/2 R

[56] References Cited

UNITED STATES PATENTS

| | | | |
|---|---|---|---|
| 2,775,428 | 12/1956 | Monthan | 37/2 R |
| 3,017,707 | 1/1962 | Sigler et al. | 37/2 R |
| 3,017,708 | 1/1962 | Gardner | 37/2 R |
| 3,017,709 | 1/1962 | Sigler | 37/2 R |
| 3,284,932 | 11/1966 | Wendlandt | 37/2 R |
| 3,427,734 | 2/1969 | Eberhart | 37/2 R |
| 3,594,931 | 7/1971 | Yost | 37/2 R |

*Primary Examiner*—Robert E. Pulfrey
*Assistant Examiner*—Eugene H. Eickholt
*Attorney*—Pendleton, Neuman, Williams and Anderson

[57] ABSTRACT

A rooted plant and soil ball may be excavated from the surrounding soil by means of an apparatus, the preferred form of which comprises a pair of diametrically opposed soil cutting members held in fixed position on a rotatable, C-shaped support member for cutting a substantially cylindrical trench in the soil surrounding the plant. After the trench has been cut, either the cutting members or a separate cutting element is moved inwardly relative to the support member for undercutting the plant.

28 Claims, 16 Drawing Figures

3,717,944

APPARATUS FOR ROOTED PLANT EXCAVATING

BACKGROUND OF THE INVENTION

This invention relates to the excavation of rooted plants such as trees and shrubs, the excavation being undertaken in such a way that the protective ball of soil surrounding the roots of the plant is maintained intact for protection of the plant during transplantation.

The apparatus is adapted for use in connection with a mobile power source such as a tractor or truck which positions the apparatus with respect to the plant to be excavated and provides the power for driving the apparatus. The apparatus is adapted first to cut a substantially cylindrical channel or trench in the soil surrounding the plant and then to undercut the soil beneath the plant. In this way the plant may be removed from the surrounding soil with the roots thereof and the protective soil ball intact. The apparatus is designed to excavate the rooted plant quickly and efficiently with a minimum of hand labor, and in the preferred form it cuts a firm, uniform soil ball in the shape of a cylinder with a hemispherical bottom, the advantages of which are described in applicant's copending application Ser. No. 790,540 filed Jan. 13, 1969, entitled "Method and Apparatus for Rooted Plant Excavating."

The invention features cutting elements of novel construction for cutting the cylindrical trench. Also featured are novel undercutting elements, a novel structure for supporting and manipulating the cutting and undercutting elements, and a novel drive mechanism.

SUMMARY OF THE INVENTION

In accordance with one embodiment of the invention a plant excavating apparatus is provided comprising a stationary frame, an annular support member mounted for rotation with respect to the frame about a substantially vertical axis, power drive means for rotating the support member and soil excavation means carried by the support member and movable in a circular path when the support member is rotated for cutting a substantially cylindrical trench in the soil surrounding the plant, thereby defining a portion of the soil ball. The excavation means is operable when the cylindrical trench has been cut for undercutting the soil beneath the plant so that the rooted plant and the soil ball may be removed from the surrounding soil. The frame and the annular support member are preferably substantially C-shaped, having a lateral opening for accommodating the trunk of the plant.

In one form of the invention the soil excavation means consists of one and preferably two pivotally movable, inwardly concave elements which are locked in an open or outwardly disposed position during initial cutting to form the sides of the ball and are released to effect inward movement and undercutting of the soil beneath the plant upon continued rotation of the support member to which they are attached.

In another form of the invention the soil excavating means consists of at least one fixed soil cutting element and one undercutting element which is mounted for movement relative to said support member and said fixed element to undercut the soil beneath the plant after the cylindrical trench has been cut. In this form of the invention there are preferably two diametrically opposed soil cutting elements attached to the support member, each element having at least one convolute blade adapted to cut and remove the soil from the channel when the support member is rotated.

The undercutting element preferably includes a curvilinear blade movable relative to the support member between a retracted position, wherein it is tucked behind and disposed substantially entirely within the annular cutting path of the fixed soil cutting elements, and an extended position, wherein it extends inwardly of said annular cutting path to approximately the axis of rotation of said fixed soil cutting elements. The blade is preferably quarter-circular and is adapted to cut while the support member to which it is attached is rotated, whereby it, in effect, cuts a substantially hemispherical bottom for the soil ball of the plant. If desired, the undercutting element or blade may be locked in its extended position to aid in the lifting and removal of the plant and soil ball.

The preferred drive means includes a mechanism mounted on the frame and positioned for driving engagement with the support member over a predetermined circumferential length which is greater than the circumferential length of the lateral opening in the support member.

DESCRIPTION OF THE PREFERRED EMBODIMENTS

Figures 1, 2:
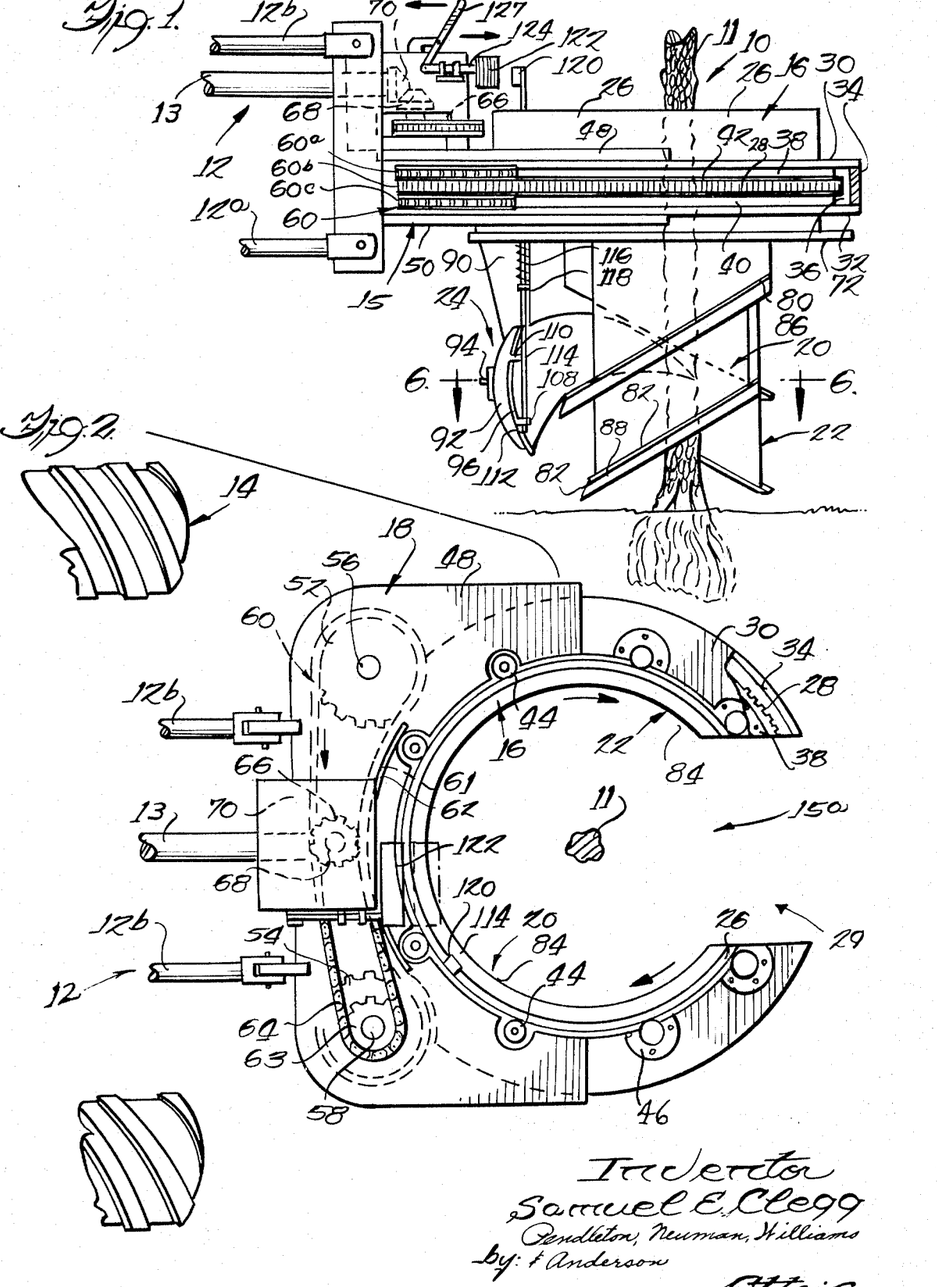
FIG. 1 is a side elevational view partially in section of an excavating apparatus embodying the features of the present invention and includes a fragmentary view of the connection to a conventional mobile power unit such as a tractor, the apparatus having been positioned in preparation for excavation of a plant.
FIG. 2 is a top plan view of the apparatus of FIG. 1.

With reference to the drawings, and more particularly to FIGS. 1 and 2, a plant excavator 10 is adapted to excavate a rooted plant 11 from the surrounding soil. The apparatus is shown attached by suitable linkage 12 to a mobile power source 14 such as a rubber wheeled tractor or truck. Driving power is transmitted from the power take-off at the rear end of the tractor through standard, well-known transmission means such as a shaft 13 operating through universal joints and slip or spline shaft couplings. The apparatus may be raised, lowered and supported by means of suitable linkage connections 12a and 12b operated by means of various hydraulic or ratchet control mechanisms which are well known in the art.

Figure 3:
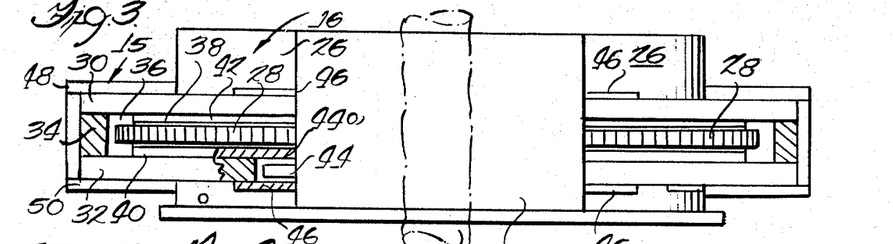
FIG. 3 is an enlarged end elevational view partially in section of the support member and frame of the apparatus looking in through the opening which is adapted to accommodate the trunk of the plant.

The excavating apparatus 10 comprises a stationary frame 15 and a support member 16 mounted for rotation with respect to the frame 15, as best illustrated in FIGS. 2 and 3. Carried on the support member 16 and depending therefrom are a pair of fixed soil cutting elements 20 and 22 comprising a first soil excavation means for cutting a substantially cylindrical trench or channel in the soil surrounding the roots of the plant 11 when the support member 16 is rotated relative to the frame 15. Also carried on and depending from the support member 16 is a second or movable soil excavation means or undercutter 24 operable for undercutting the soil beneath the plant after the surrounding trench has been cut by the first excavation means, so that the rooted plant and soil ball may be removed from the surrounding soil.

The support member 16 has a substantially cylindrical body portion 26 and an annular flangelike sprocket portion 28 which in this embodiment is integral with the body portion 26 and extends radially outwardly from the exterior surface of the body portion. The body portion 26 and the sprocket portion 28 are C-shaped, being provided with a lateral gap or opening 29 in order to accommodate the trunk of the plant 11 and to permit positioning of the apparatus as shown in FIGS. 1 and 2 preparatory to excavation. The frame 15 has a corresponding opening and is thus substantially C-shaped, although as will be more fully described, the opening in the frame may be provided with a closure.

The support member 16 is mounted for rotation about the substantially vertical axis of the cylindrical body portion 26 within the aperture 15a of the frame 15. The frame 15 has a C-shaped top plate 30, an identically constructed substantially C-shaped bottom plate 32 and a relatively narrow spacer plate 34 disposed between the top and bottom plates at the outside edge thereof to define an inwardly open channel 36.

Disposed within the channel and substantially aligned with the inside edges of the semicircular top and bottom plates 30 and 32 are a pair of stationary, C-shaped bearing rings 38 and 40. The bearing ring 38 is affixed to the top plate 30, and the bearing ring 40 is affixed to the bottom plate 32, thereby defining a substantially horizontal guideway 42 into the channel 36. The height of the guideway 42 is just slightly greater than the thickness of the flangelike sprocket portion 28 of the support member 16, and the support member sprocket portion is adapted to rotate within this channel. If desired, suitable roller bearings could be provided between the bearing rings 38 and 40 and the relatively rotatable sprocket portion 28 of the support member 16.

The top and bottom plates 30 and 32 preferably carry a plurality of angularly spaced rollers 44 which protrude radially a very slight distance into the frame's central aperture 15a in which the body portion 26 of the support member is adapted to rotate. The top and bottom plates 30 and 32 may be apertured to accommodate these rollers 44, with the axle 44a of each roller being affixed to the adjacent bearing ring 38 or 40, as the case may be. Cover plates 46 may be used to cover the apertures in the top and bottom plates. In FIG. 3 portions of the bottom plate 32, the bearing ring 40 and one of the cover plates 46 have been broken away to show one of the rollers 44. The rollers rollably engage the exterior surface of the support member body portion 26 and maintain the body portion in vertical alignment with respect to the frame 15.

Opposite the lateral opening 29 in the frame 15 are two identically constructed panels 48 and 50, the panel 48 being affixed to the top plate 30 and the panel 50 being affixed to the bottom plate 32. The panel 48 is best illustrated in FIG. 2. Between the panels 48 and 50 are a pair of sprockets 52 and 54, sprocket 52 being journaled on a shaft 56 and sprocket 54 being keyed to a rotatable shaft 58. The sprockets 52 and 54 are spaced laterally, and extending around these sprockets is a chain 60.

In the preferred embodiment the sprockets 52 and 54 have two vertically spaced, identically constructed sprocket elements, and the chain 60 has three strands 60a, 60b and 60c (see FIG. 1). The two spaced sprocket elements of each of the sprockets 52 and 54 are adapted to mesh respectively with the top and bottom strands 60a and 60c of the chain, and the middle strand 60b of the chain is aligned with the space between the sprocket elements. This middle strand 60b of the chain is adapted to mesh with the teeth on the sprocket portion 28 of the support member 16.

The lateral spacing between the sprockets 52 and 54 is preferably such that as the gap or opening 29 of the support member sprocket portion 28 is rotated past the sprockets 52 and 54, a substantial length of the middle strand 60b of the chain will remain in meshing engagement with the teeth of the sprocket portion 28. Thus the length of chain 60 in the innermost chain run 61 between the sprockets will be substantially greater than the width of the opening in the support member sprocket portion 28.

In order to support the inner run 60a of the chain 60 when the opening 29 in the support member sprocket portion 28 is rotated past the chain and sprockets, an arcuately-shaped hardened steel support bar 62 is connected to and depends from the mounting plate 48. This arcuate bar 62 extends between the sprockets 52 and 54 and is disposed just inwardly (i.e., to the right in FIG. 2) of the normal arcuate path of the chain 60 and the path of the teeth of the sprocket portion 28 of the support member 16. Thus, the chain 60 is not permitted to sag perceptibly in this area even when the opening 29 in the support member 28 is rotated past the chains and sprockets.

The sprockets 52 and 54 may be driven from the power take-off 13 of the tractor 14 through connecting power linkages. In the illustrated embodiment, the shaft 58 to which the sprocket 54 is keyed extends upwardly above the plate 48, and a sprocket 63 is keyed to the top of this shaft. The sprocket 63 may be driven by means of a chain 64 which extends around a drive sprocket 66 (see FIG. 1) keyed to the shaft of a first bevel gear 68, which, in turn, is driven by a second bevel gear 70 attached to the power take-off 13 from the tractor 14. As an alternative means of driving, a hydraulic motor could be utilized as a power source for driving one of the sprockets 52 or 54. It will also be appreciated that the support member 16 may be driven by means of two small gears 52' and 54' which directly engage the ring gear 28' that is attached to and forms a part of the support member (see FIG. 14). The gears 52' and 54' would be substituted for the sprockets 52 and 54 and spaced so that at least one of the gears would engage the ring gear 28' during all positions of rotation of the support member 16. The gears would be synchronized by suitable, well known interconnecting linkages such as a chain or gear train (not shown).

The support member 16 carries the soil excavation means. For this purpose a plate 72 is bolted to the bottom of the support member body portion 26, and the various soil cutting and undercutting structures are welded, bolted or otherwise affixed to this plate. It is preferred that the soil cutting and undercutting structures be adjustably connected to the plate 72 so that the size of the ball may be regulated.

Figure 6:
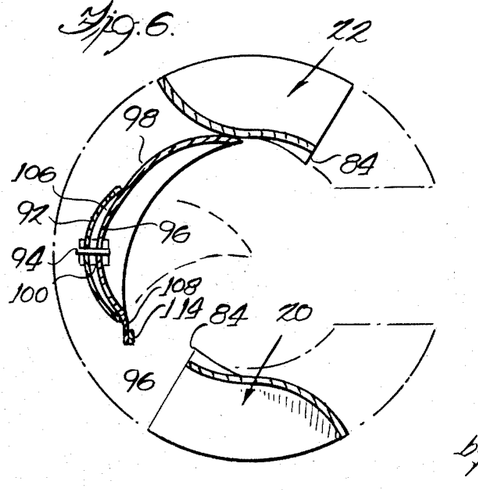
FIG. 6 is a sectional view taken substantially along line 6—6 of FIG. 1.
Figure 7:
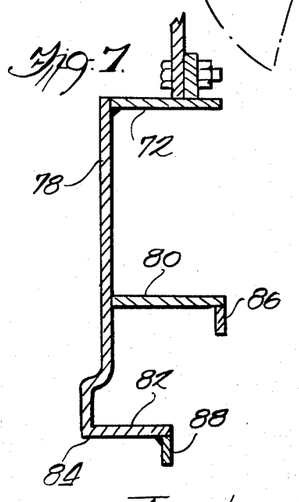
FIG. 7 is an enlarged sectional elevational view of one of the soil cutting elements of the first soil excavation means.

In the preferred embodiment of the invention, the excavation means includes both fixed and movable excavation means. The first or fixed excavation means consists of two diametrically opposed, identically constructed soil cutting elements 20 and 22 (see FIG. 1). As best illustrated in FIG. 7 each soil cutting element has a substantially arcuate, vertically disposed plate 78 and a pair of convolute blades or flights 80 and 82. The blades are sharpened along their leading (lowermost) edges for cutting into the soil. The inner extremity 84 of the cutting edge of the lower blade 82 and the adjacent portion of the plate 78 on each cutting element are offset inwardly as best illustrated in FIGS. 6 and 7. This assures that only this edge and plate portion will cut and rub against the soil ball as it is being cut. The remaining portions of the soil cutting element thus will not rub against the ball of the plant, for these portions are offset radially outwardly from the ball and, therefore, move through the trench which has been cut by the lower blade or flight 82.

It will be noted that the upper blade 80 is of greater width than the lower blade 82. In this way the upper blade 80 will cut the soil outside of the cut which has been made by the lower blade 82. Thus both blades do some of the cutting; the lower blade 82 cuts the inside portion of the trench, and the upper blade 80 enlarges the trench by cutting outside of the lower blade. This design also permits the use of shorter spiral blades or flights. The lower blade 82 raises the dirt to the level of the upper blade cut, and the upper blade 80 then raises the dirt still further and deposits it on the surface of the ground around the hole.

It has been found particularly advantageous to provide the upper and lower blades 80 and 82 of each cutting element with stabilizing plates or shoes 86 and 88, respectively. As best illustrated in FIG. 7 these shoes are merely thin strips which are welded along the outside edge of the blades, and they engage the outside wall of the trench which is being cut by the blade to which they are attached. Thus the shoe 88 attached to the outside edge of the lower blade 82 will engage the outside wall of the trench which is cut by that blade. The upper blade 80 enlarges this trench and the shoe 86 on the outside of this blade engages the outside wall of the enlarged trench. As a result of these shoes 86 and 88 there is a substantial reduction of the vibration in the cutting action of the blades.

The second or movable soil excavation means 24 is adjustably affixed to the annular plate 72 at the bottom of the support member body portion 26 by means of a bracket 90. Welded to the bottom of the bracket is a circular dished plate 92 through which a horizontal shaft 94 extends (see FIG. 6). A second dished plate 96 is keyed to the rod 94, and a thin sharpened dished blade 98 is welded or otherwise affixed to the second dished plate 96. Between the two dished plates 94 and 96 is a concave washer 100.

Figure 4:
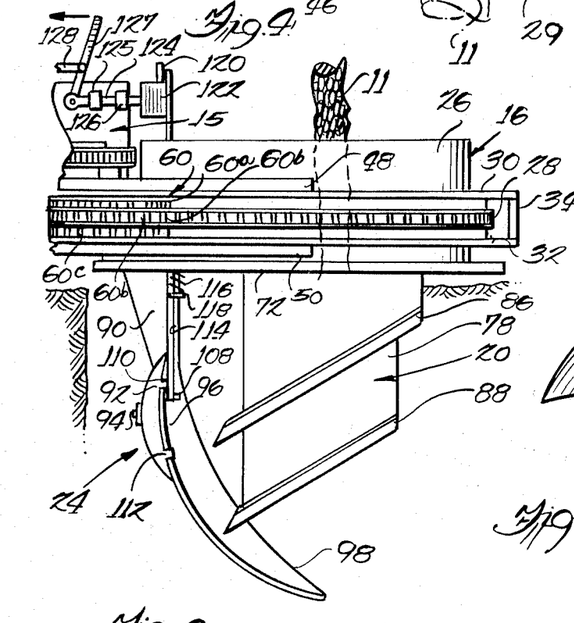
FIG. 4 is a side elevational view of the apparatus of FIG. 1 showing the apparatus after it has been operated to excavate the cylindrical trench and after the blade of the second excavation means has been moved downwardly to undercut the soil beneath the plant, forming a substantially hemispherical bottom for the soil ball.

Affixed to the second dished plate 96 is an operating arm 108, and a pair of stops 110 and 112 affixed to the first dished plate 92 limits the pivotal movement of the operating arm 108 (see FIGS. 1 and 4).

Pivotally connected to the end of the operating arm 108 is a rod 114 which extends upwardly through the plate 72 interiorly of the cylindrical body portion 26 of the support member. A coil spring 116 extends between the plate 72 and a fixed washerlike member 118 on the rod 114. The spring 116 urges the rod 114 downwardly and urges corresponding clockwise movement (as viewed in FIG. 5) of the arm 108 affixed to the dished plate 96. This clockwise movement of the dished plate 96 causes corresponding clockwise rotation of the dished blade 98 affixed thereto. This clockwise rotation ceases when the arm 108 engages the bottom stop member 112 and the dished blade 98 reaches the position illustrated in solid lines in FIGS. 1, 5 and 6.

Figure 5:
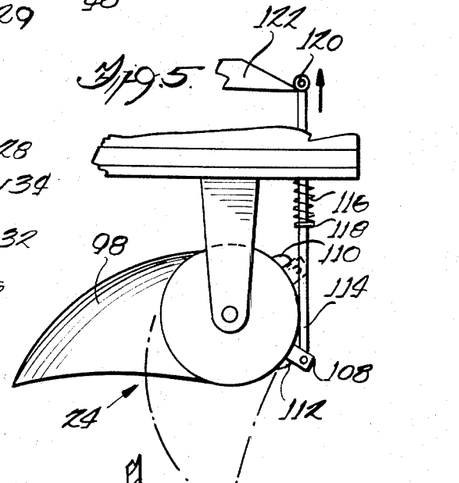
FIG. 5 is an end elevational view of the second excavation means for undercutting the soil beneath the plant.

It is evident that raising of the rod 114 causes lowering or counterclockwise rotation of the blade 98 as viewed in FIG. 5. One means for accomplishing this movement is shown. At the upper end of the rod 114 is a cam roller 120 adapted to engage an inclined block 122 mounted on the frame 15 for movement into and out of the path of the roller 120 (see FIG. 1). The block 122 is affixed to an arm 124 which is mounted for reciprocal sliding movement in guides 125 and 126 affixed to the frame 15. A lever 127 centrally pivoted on a bracket 128 has its lower end pivotally connected to the end of the arm 124. Movement of the upper end of the lever to the left as shown by the top arrow in FIGS.

1 and 2 will cause movement of the arm 124 and block 122 to the right and into the path of the roller 120 which rotates with the support member 16 relative to the frame 15.

In order to actuate the second or movable excavation means 24 the inclined block 122 is thus moved into the path of the roller 120, and as the roller rotates past the block 122, it engages and rolls up the inclined surface of the block causing the rod 114 to move vertically upward. This causes the blade 98 to move downwardly or in the counterclockwise direction as viewed in FIG. 5 to the position illustrated in solid lines in FIG. 4 and in dotted lines in FIGS. 5 and 6.

The undercutter or second excavation means 24 illustrated in FIGS. 1, 4, 5 and 6 is a "universal" undercutter because it is suitable for excavating the largest number of plants. This type of undercutter is most suitable where the soil is moist or has a substantial clay content so that the soil holds together in the ball. When this undercutter 24 is used with the fixed soil cutting elements 20 and 22, the ball has substantially cylindrical sides and a substantially hemispherical bottom.

Figures 14, 15, 16:
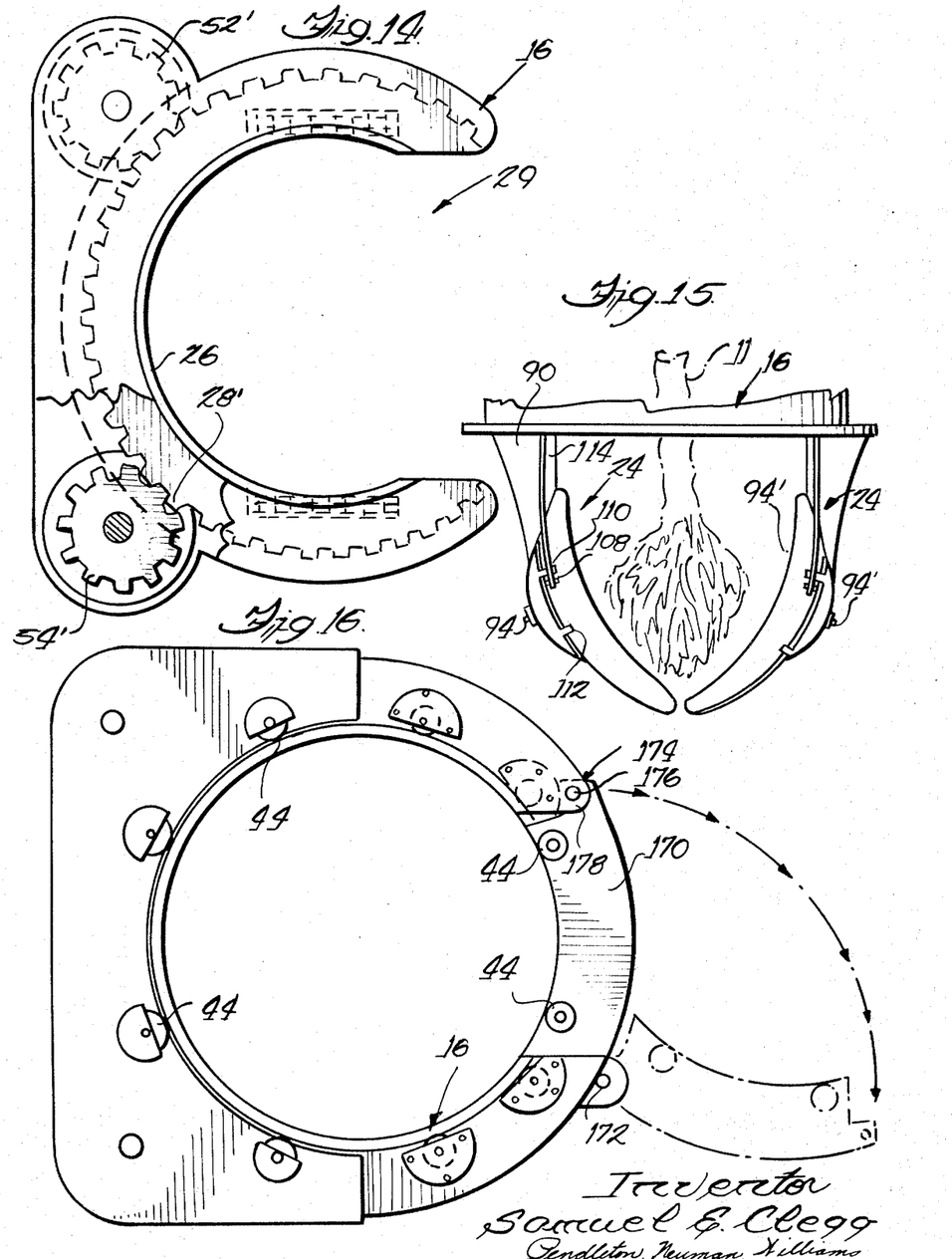
FIG. 14 is a top plan view of a modified drive means for the apparatus.
FIG. 15 is a side elevational view of soil cutting elements of additionally modified construction.
FIG. 16 is a top plan view of a frame slightly modified by the addition of a closure for the lateral opening.

This undercutter 24 may, however, be also used by itself (i.e., without the fixed soil cutting elements 20 and 22), and in this case the entire ball would be substantially hemispherical which might be satisfactory for use for digging shallow rooted plants. In FIG. 15 two of these cutters are placed opposite each other on the support member 16 so they will balance during rotation. In this embodiment the shafts 94 and 94' are angled upwardly from the horizontal giving a wider cut. If angled downwardly the bottom of the ball could be angled and made deeper with this design.

In operation, the plant excavating apparatus 10 which is attached to and powered by a tractor or other mobile power unit is moved into position with respect to the plant to be excavated. As it is moved into position the trunk of the plant 11 is permitted to enter the opening in the support member 16 and frame 15, the two openings being aligned in the starting position of the mechanism. When the trunk of the plant has been centered at approximately the axis of the support member 16, power to the power take-off 13 from the tractor is applied, rotating the chain 64 in the direction of the arrow causing the sprocket 63 to move in the counterclockwise direction as viewed in FIG. 2 and causing the sprockets 52 and 54 and the chain 60 to move in the counterclockwise direction as viewed in FIG. 2. Since the chain 60 is in meshing engagement with the teeth of the sprocket portion 28 of the support member 16, the support member 16 will be rotated in the opposite direction, i.e., in the clockwise direction as indicated by the arrows.

The frame 15 is lowered by the linkages 12a and 12b on the tractor until the cutting blades engage the soil and begin the excavation of a cylindrical trench. A downward pressure is preferably maintained on the apparatus during excavation.

The trench is first cut by the lower blade 82, and as cutting progresses, the dirt is transferred from the lower blade upper blade the upperblade 80. As the soil cutting elements 74 and 76 are rotated, the inner edge of the lower blade 82 cuts the inside diameter of the trench, and the outer edge of the upper blade 80 cuts the outside diameter of the trench, with the shoes 86 and 88 serving to stabilize the cutters as they rotate in the trench portion which has been cut.

When the fixed blades 20 and 22 have excavated a cylindrical trench of the desired depth, the block 122 is moved into position, and on the next rotation of the support member 16, the roller 120 of the undercutter or second excavation means 24 rolls up the inclined surface of the block 122 and pulls the rod 114 upwardly. As previously described this rotates the arm 108 upwardly against the resistance of the spring 116 causing the dished blade 98 to move downwardly.

This undercutting phase of the excavating operation is done preferably at reduced speed, and once started, the blade 98, because of its dished shape, will actually move downwardly of its own accord. This downward movement (counterclockwise rotation) of the blade 98 ceases when the blade reaches its lowermost position illustrated in solid lines in FIG. 4 and in doted lines in FIGS. 5 and 6, at which time the operating arm 108 engages the upper stop member 110. Rotation of the support member 16 through 360° after the blade 98 has been fully extended results in a complete undercutting of the rooted plant 11. The plant and ball are thus cut free of and may be removed from the surrounding soil. The tractor then lifts the apparatus 10 with the ball of the tree therein and moves it to the desired location such as, for example, onto a burlap wrap. As soon as the ball is deposited on the wrap, the weight of the plant and soil ball is taken from the extended blade 98, and the blade is permitted to snap back to its original retracted position illustrated in FIG. 1 under the influence of the spring 116. The unit is withdrawn from around the trunk 9 of the excavated plant, and it is ready for the next excavation.

Figures 8, 9, 10, 11, 12, 13:
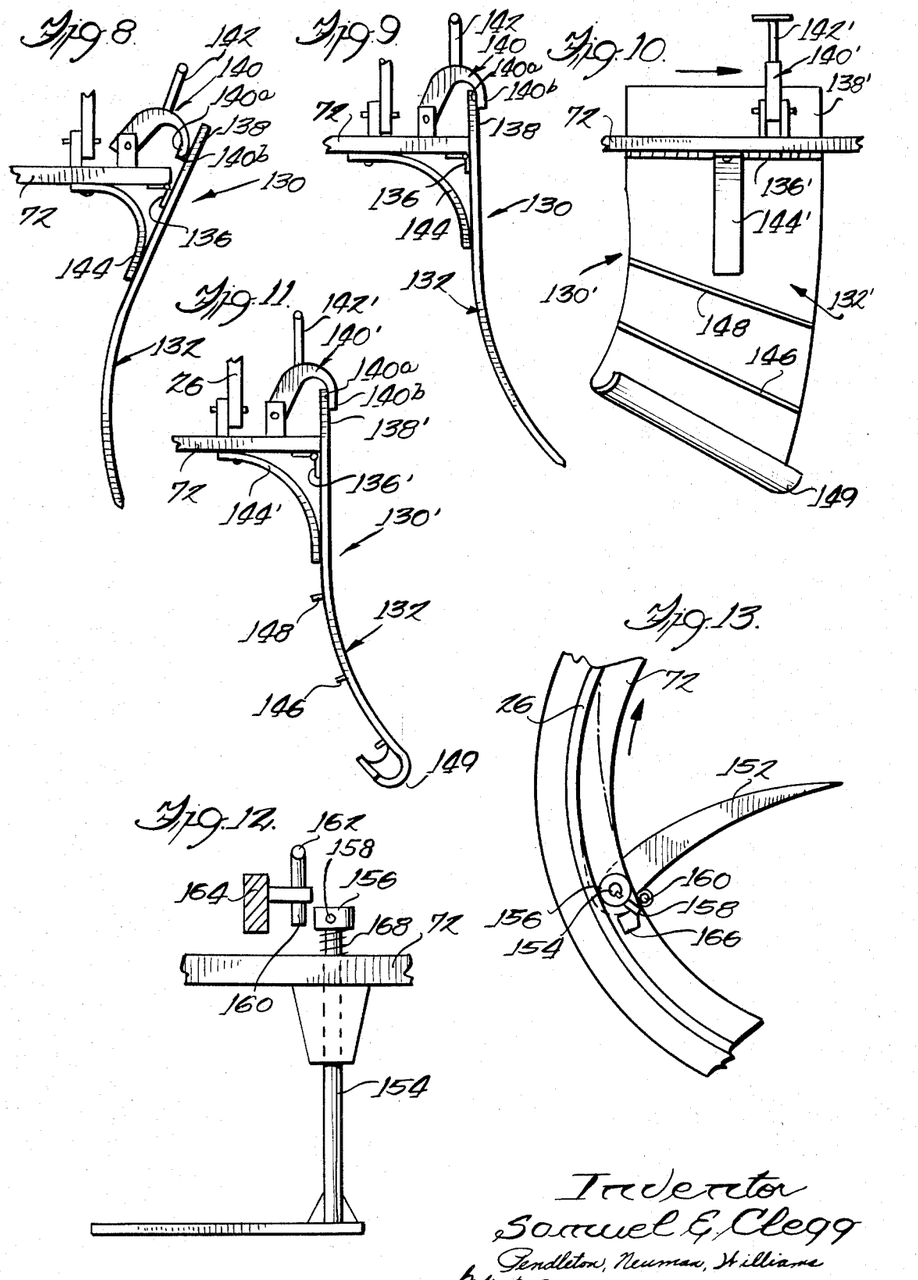
FIG. 8 is a side elevational view of a soil cutting element of modified construction locked in its open position during initial cutting around the plant.
FIG. 9 is a side elevational view of the modified soil cutting element of FIG. 8 locked in its closed position to undercut the plant and permit removal of the plant and soil ball.
FIG. 10 is an end elevational view of a soil cutting element of further modified construction.
FIG. 11 is a side elevational view of the soil cutting element of FIG. 10.
FIG. 12 is an end elevational view of a soil cutting element of still further modified construction.
FIG. 13 is a top plan view of the soil cutting element of FIG. 12 showing the inward movement of that element to undercut the plant.

In excavating certain plants it may be desirable to have a pear-shaped ball with a deeper, somewhat more tapered bottom. An undercutter structure 130 for cutting a ball of this shape is illustrated in FIGS. 8 and 9. The blade 132 of this undercutter is inwardly dished (concave). The blade is connected to the plate 72 at the bottom of the support member body portion 26 by means of a hinge connection 136, the axis of which is tangential to the path of rotation of the blade 132 and the support member body portion 26. The upper end 138 of the blade 132 extends above the level of the plate 72, and a hook member 140 having a hook portion 140a and a nose portion 140b is manipulated by means of a handle 142 to engage and lock the upper end 138 of the blade in its two positions of adjustment as illustrated in FIGS. 8 and 9, respectively. The blade 132 is locked in its outwardly disposed position as shown in FIG. 8 during cutting of the substantially cylindrical initial cut or trench. When the trench has been cut the blade is released, permitting it to move inwardly as the support member continues its rotation until the blade reaches the position of FIG. 9. It is then locked in this position by the nose portion 140b of the hook member. The locking of the blade in its inwardly disposed position permits the ball and plant to be raised when the apparatus is raised. A leaf spring 144 or other resilient means urges the blade toward its outwardly disposed position, so that after the balled plant has been excavated and removed from the hole and it has been placed on the covering burlap or the like, the handle 142 may be raised and the blade will return to its original outwardly disposed position under the influence of the leaf spring 144.

The blade 132 may thus serve as an undercutter and be used in combination with fixed cutters such as 20 and 22 which cut the cylindrical trench around the plant. However, the undercutter 132 may be used in combination with an identically constructed undercutter disposed on the opposite side of support member body portion 26. In this arrangement the hinge connections 136 of the two undercutters 130 are substantially parallel and tangential to the path of rotation of the undercutters. In such case there is no need for the fixed cutters 20 and 22 for the two undercutters will cut or slice around the sides of the plant when locked outwardly and will undercut when released with both rotation and downward pressure continued.

In FIGS. 10 and 11 an undercutter 130' of similar construction is illustrated, the only differences being that a plurality of vertically spaced, convolute flights or blade guides 146 and 148 are provided and the lower end 149 of the blade is formed outwardly and angled upwardly from its leading to its trailing edge. The blade 132' is otherwise the same shape as the blade 132 of the previously described undercutter 130, the similar parts being given prime number designations. Thus, the undercutter blade 132' is inwardly dished, and it is connected to the plate 72 by means of a hinge connection 136'. A hook member 140' having a hook portion 140a' and a nose portion 140b' engages the upper end 138' of the blade 132' above the hinge connection to lock the blade in its two positions of adjustment. The hook 140' is manipulated by means of a handle 142', and a leaf spring 144' urges the blade toward its outwardly disposed position.

The undercutter 130' is most suitable for use in a sandy soil where a smooth undercutter may disturb the ball. The ball tends to be more hemispherical in shape than that cut by the smooth undercutter 130. As in the case of the smooth undercutter 130, the undercutter 130' may be used solely as an undercutter, or it may be used with an identically constructed, oppositely disposed undercutter to effect both the initial cylindrical trenching and the final undercutting, thereby eliminating the need for the fixed cutters 20 and 22.

An undercutter 150 of somewhat different construction is illustrated in FIGS. 12 and 13. This undercutter has a flat blade 152 affixed to a vertical shaft 154 which extends upwardly through the plate 72 interiorly of the cylindrical body portion 26 of the support member. Keyed to the upper end of the shaft 154 is a collar 156 which has a radially protruding dog 158. A pin 160 having an operating handle 162 is mounted in a fixture 164 on the frame 15 for vertical movement between a raised and a lowered position. When in its lowered position, the pin 160 is in the circular path of the dog 158 on the collar 156, and when the dog engages the pin, the collar, the shaft 154 and the blade 152 move in the clockwise direction as viewed in FIG. 13. Thus the blade 152 is moved inwardly until the dog 158 engages a stop 166 affixed to the plate 72. A coil spring 168 urges the shaft 154 and blade in the counterclockwise direction to the retracted position illustrated in dotted lines in FIG. 13. In this retracted position the blade is tucked behind one of the fixed cutters 20 or 22 and is disposed substantially entirely within the cutting annulus described by the rotation of the cutters 20 and 22.

The undercutter 150 is used with the fixed cutters 20 and 22, and the "ball" cut has a flat bottom, which is desirable where the plant is to be placed in a flat bottom container.

The apparatus has been described as C-shaped or open at one side, however, it can be closed by means of a hinged segment, for example, to provide more bearing surface and more support if desired.

In certain embodiments of the apparatus it may be desirable to provide a gate or closure 170 for the opening in the frame 15. The gate 170 shown in FIG. 16 is merely an extension of the frame 15 and is connected to the frame at one side by means of a hinge 172. At the opposite side of the frame opening is a lock 174. The lock 174 may be in the form of simple latch bolt type with a removable bolt or pintle 176 so that when the gate is closed and the cylindrical or eye portions 178 carried on the gate and frame are aligned, the pintle 176 may be inserted to lock the gate in its closed position. This gate or closure 170, which may carry additional rollers 44, provides added support and bearing surface for the support member 16 which rotates relative to the frame 15.

It is to be understood that the present disclosure has been made only by way of example and that many additional modifications and changes in various details may be resorted to without departing from the invention.

WHAT IS CLAIMED IS:

1. An apparatus for excavating a rooted plant and soil ball from the surrounding soil, said apparatus comprising frame means, a rotatable support member defining an annulus and rotatably mounted to said frame means, power means secured relative to said frame and connected for rotating said support member relative to said frame means about a generally vertical plant axis, soil excavation means carried by said support member for cutting the soil surrounding and underlying said plant, said excavation means including curvilinear soil cutting means mounted on said support member and rotatable therewith, said cutting means being mounted for rotation about an axis transverse to said plant axis, said cutting means being rotatable about said transverse axis from a position generally concentric with said plant axis to a position underlying and inwardly of said annulus.

2. The apparatus of claim 1 wherein said soil cutting means is mounted for pivotal movement with respect to said support member, said soil cutting means being shaped to move radially inwardly as it is forced downwardly and rotated in contact with the soil, and means for releasably locking said soil cutting means in a downwardly depending, outwardly disposed position, whereby said soil cutting means when rotated will cut a substantially cylindrical trench and when released will undercut the soil.

3. The apparatus of claim 2 wherein said soil cutting means is inwardly concave.

4. The apparatus of claim 3 wherein said excavation means has a cylindrical portion with a plurality of vertically spaced convolute flights.

5. The apparatus of claim 3 wherein there are a pair of diametrically opposed soil cutting means.

6. The structure of claim 5 wherein said soil cutting means are connected to said support member for pivotal movement about a plurality of generally parallel axes which are generally normal to the path of rotation of said soil cutting means.

7. The structure of claim 1 wherein said soil excavation means further includes means resiliently urging said soil cutting means toward an outwardly disposed position.

8. An apparatus for excavating a rooted plant and soil ball from the surrounding soil, said apparatus comprising frame means, a rotatable support member defining an annulus and rotatably mounted to said frame means, power means secured relative to said frame and connected for rotating said support member relative to said frame means about a generally vertical plant axis, soil excavation means carried by said support member for cutting the soil surrounding and underlying said plant, said excavation means including first soil cutting means carried by said support member for cutting a substantially cylindrical channel in the soil surrounding the plant and defining a portion of the soil ball when said support member is rotated and second soil cutting means rotatably mounted from said support member about an axis transverse to said plant axis and operable when the channel has been cut to rotate about said transverse axis to undercut the soil beneath said plant.

9. The apparatus of claim 8 wherein said first soil cutting means includes a pair of diametrically opposed soil cutting elements attached to said support member, each element having at least one convolute blade adapted to cut a generally cylindrical chamber and remove the soil from the channel when said support member is rotated.

10. The apparatus of claim 9 wherein each of said soil cutting elements has a plurality of vertically spaced convolute blades to cut and remove the soil from the channel.

11. The apparatus of claim 10 wherein the inner extremity of the cutting edge of the lowermost blade is inwardly offset relative to the upper blade, whereby said inner extremity of that blade cuts and defines the periphery of the ball.

12. The apparatus of claim 10 wherein the uppermost blade is wider than the lowermost blade.

13. The apparatus of claim 12 wherein the outer edge of at least one of said blades carries a stabilizing shoe to engage and rub against the outside of the channel cut by that blade.

14. The apparatus of claim 8 wherein said second soil cutting means includes a blade movable relative to said support member between a retracted position, wherein it is disposed substantially entirely within the cutting channel described by the rotation of said first excavation means, and an extended position, wherein it extends inwardly of said annulus to approximately the axis of rotation of said first excavation means.

15. The apparatus of claim 14 wherein said blade is curvilinear and is pivotally movable about an axis transverse to the axis of rotation of said support member.

16. The apparatus of claim 15 wherein said first soil excavation means is rotatable about a substantially vertical axis and the curvilinear blade of said second soil cutting means is movable about a substantially horizontal axis.

17. The apparatus of claim 14 wherein resilient means is provided urging said curvilinear blade toward said retracted position.

18. The apparatus of claim 1 wherein said soil excavation means includes a pair of opposed soil cutting elements carried by said support member, said soil cutting elements being mounted for pivotal movement with respect to said support member between retracted and extended positions about axes which extend generally radially with respect to the axis of rotation of said support member, and selectively operable means mounted to said apparatus for forcibly moving said soil cutting elements from their retracted to their extended positions.

19. The apparatus of claim 1 wherein said annular support member has a lateral opening for accommodating the trunk of the plant.

20. The apparatus of claim 19 wherein the frame has an opening corresponding to the opening in said support member for accommodating the trunk of the plant.

21. The apparatus of claim 20 wherein a removable closure member is provided having a closed position on said frame closing the opening in said frame for providing support for said support member across said opening.

22. The apparatus of claim 21 wherein said closure member is hingedly connected to said frame for swinging movement between an open and a closed position, and means is provided on said apparatus for releasably locking said closure member in its closed position.

23. The apparatus of claim 19 wherein said annular support member has a toothed portion extending therefrom, and said drive means includes support member engaging means in meshing engagement with said toothed portion in all positions of rotation of said support member.

24. The structure of claim 20 wherein said drive means includes a mechanism mounted on said frame and positioned for driving engagement with said support member over a predetermined circumferential length which is greater than the circumferential length of said lateral opening in said support member.

25. The structure of claim 23 wherein said drive mechanism includes a pair of laterally spaced sprockets, an endless chain extending around said sprockets and in driving engagement with said support member toothed portion over a predetermined circumferential length which is greater than the circumferential length of said support member lateral opening.

26. The apparatus of claim 25 wherein said frame carries a chain support element positioned to engage and radially support said drive chain as the opening of said support member is rotated past said drive chain.

27. The structure of claim 25 wherein each of said sprockets includes a pair of vertically spaced, axially aligned sprocket elements with the sprocket portion of said support member being aligned horizontally with the spacing between said sprocket elements, said chain being three strands with the links of the outer two strands meshing with said sprocket elements and the links of said intermediate strand meshing with the tooth sprocket portion of said support member, and means for effecting rotation of at least one of said sprocket elements.

28. The apparatus of claim 22 wherein said drive means includes a pair of gears positioned for meshing engagement with said support member teeth, said gears being spaced apart by a distance greater than the circumferential length of said lateral opening in said support member, whereby at least one of said gears will be in driving engagement with said support member in every position of said support member.

* * * * *